United States Patent
Stephany et al.

(10) Patent No.: US 7,251,126 B2
(45) Date of Patent: Jul. 31, 2007

(54) ROTATABLY RETRACTABLE IMAGE DISPLAY SYSTEM

(75) Inventors: Thomas M. Stephany, Churchville, NY (US); Richard W. Wien, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 270 days.

(21) Appl. No.: 11/020,403

(22) Filed: Dec. 22, 2004

(65) Prior Publication Data

US 2005/0141181 A1 Jun. 30, 2005

Related U.S. Application Data

(63) Continuation-in-part of application No. 10/621,898, filed on Jul. 17, 2003, now abandoned.

(51) Int. Cl.
*H05K 5/00* (2006.01)
*B60Q 1/00* (2006.01)
*G09B 25/00* (2006.01)
*G09G 5/00* (2006.01)

(52) U.S. Cl. .......... 361/681; 362/493; 362/490; 434/365; 345/905; 345/169; 248/923; 248/920

(58) Field of Classification Search .......... 361/681
See application file for complete search history.

(56) References Cited

U.S. PATENT DOCUMENTS

| D235,517 S | * | 6/1975 | Watanabe ............. D10/15 |
| 4,081,952 A | * | 4/1978 | Busch et al. ............. 368/82 |
| 4,989,167 A | * | 1/1991 | Kapec et al. ............. 361/681 |
| 5,072,956 A | * | 12/1991 | Tannehill et al. ....... 280/33.992 |
| 5,843,477 A | * | 12/1998 | Alexander ............. 424/466 |
| 6,215,480 B1 | | 4/2001 | Danis et al. |
| 6,295,883 B1 | | 10/2001 | Tsukada et al. |
| 6,345,458 B1 | * | 2/2002 | Garibian ............. 40/506 |
| 6,744,623 B2 | * | 6/2004 | Numano et al. ............. 361/681 |
| 7,136,030 B2 | * | 11/2006 | Steed et al. ............. 345/7 |
| 2004/0148832 A1 | * | 8/2004 | Albenda ............. 40/610 |
| 2005/0169347 A1 | * | 8/2005 | Kuo ............. 374/121 |
| 2006/0072286 A1 | * | 4/2006 | Tseng ............. 361/681 |

* cited by examiner

*Primary Examiner*—Boris Chervinsky
*Assistant Examiner*—Zachary Pape
(74) *Attorney, Agent, or Firm*—Peyton C. Watkins

(57) ABSTRACT

A system for displaying images includes: (a) a base; (b) a movable, arcuate-shaped receptacle that rotates into and from the base; and (c) a display attached to the receptacle so that the display is visible when the receptacle is rotated from the base and the display is partially or entirely not visible when the receptacle is rotated into the base.

8 Claims, 6 Drawing Sheets

ROTATABLY RETRACTABLE IMAGE DISPLAY SYSTEM

CROSS-REFERENCE TO RELATED APPLICATIONS

This is a continuation-in-part of application Ser. No. 10/621,898, filed Jul. 17, 2003 now abandoned entitled "Rotatably Retractable Image Display System" by Thomas M. Stephany et al.

FIELD OF THE INVENTION

The invention relates generally to the field of displays and display enabled devices and, more particularly, to such devices having an arcuate-shaped rotatable enclosure that holds a display which, when retracted, is safely hidden and protected from viewing. This system of the present invention, when rotatably retracted, both removes power from the display or system, and protects the display screen. The rotatable arcuate-shaped display enclosure comprises an extremely safe and padded surface; the surface having no injurious portions making the use of this implementation highly desirable in aircraft, automobiles and consumer devices for the prevention of injuries to a user. There exists no sharp edges or flimsy flat panels to break. When the display is extracted from the arcuate-shaped housing the display displays normally, but is still recessed and still possesses all the afore properties. The implementation improves robustness, safety and maintenance costs that make this display system especially advantageous.

BACKGROUND OF THE INVENTION

Display systems are currently available for permitting viewing of images thereon. They are commonly used in automobiles such as police cars, and aircraft for showing movies and the like. Such displays are available from a number of sources including Sanyo and Sony of Japan, and Philips in the Netherlands. Displays are also commonly used in laptop computers from a variety of manufacturers such as IBM. These types of displays demonstrate extreme drawbacks for many mobile applications in that they include sharp square edges which are unsafe in an accident and generally delicate if not carefully retracted into a closed position.

Although these currently available technologies are demonstrated as being satisfactory for rudimentary consumer purposes, they are not acceptable for use in value applications such as automobiles and aircraft where safety and ruggedness and low service costs are necessary and desirable. Therefore, a need exists for providing improved retractable display systems that are acceptable for widespread commercial adoption.

SUMMARY OF THE INVENTION

The present invention is directed to overcoming one or more of the problems set forth above. Briefly summarized, according to one aspect of the present invention, the present invention resides in a system for displaying images comprising a base; which contains a movable, arcuate-shaped display receptacle that rotates into and out of the base, and a display attached to the receptacle so that the display is visible when the receptacle is rotated from the receptacle and the display is partially or entirely not visible when the receptacle is rotated into the base.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of providing safe, robust and low maintenance cost viewing in a relatively small device. It also includes the ability of viewing when rotatably extracted, and not being viewed when rotatably retracted. Extreme safety is achieved by virtue of the arcuate-shaped cylindrical design.

DETAILED DESCRIPTION OF THE INVENTION

In the following description, the present invention will be described in the preferred embodiment as a system displaying images. The invention refers to a safe, robust and low maintenance viewing system that can be part of a small device. In particular the display is protected against accidental dropping when used in a PDA or a computer system and an object or person striking it when used in a system in a commercial or consumer vehicle. In the latter case this provides protection for the display as well as users.

Figure 1A:
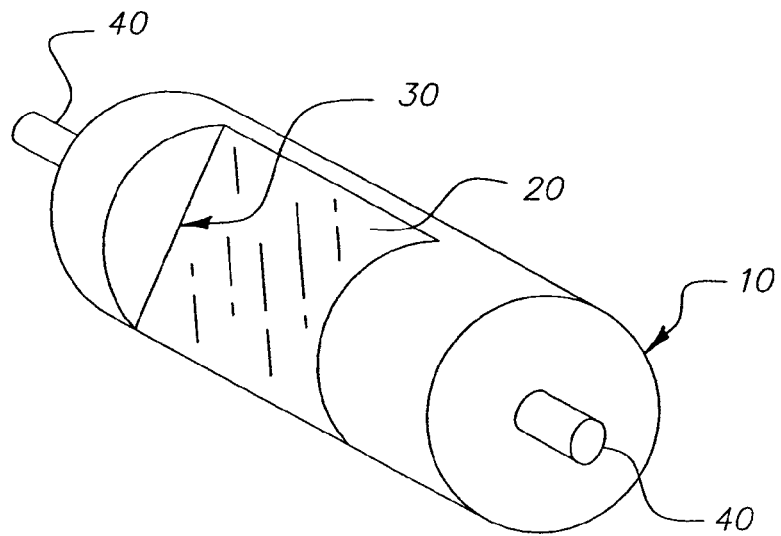
FIGS. 1a and 1b are a perspective view of an arcuate-shaped display tube and its respective arcuate-shaped receptacle.
Figure 1B:
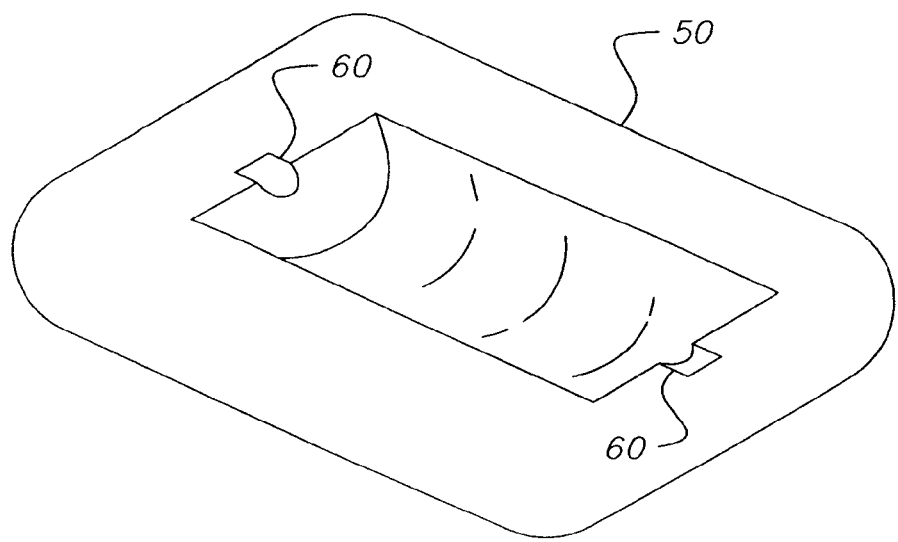

Referring first to FIGS. 1a and 1b, a drawing of an arcuate-shaped display tube 10 is represented upon which a display 20 is attached. The attached display 20 can be constructed from a number of technologies such as LCD or Organic LED'S, and is displaced upon a flat section 30 of the display tube 10. The flat section 30 can be rotated about the two rotational members 40. This configuration allows the display 20 to be rotated into an arcuate-shaped base 50 and rotational member receptacles 60.

Figure 1C:
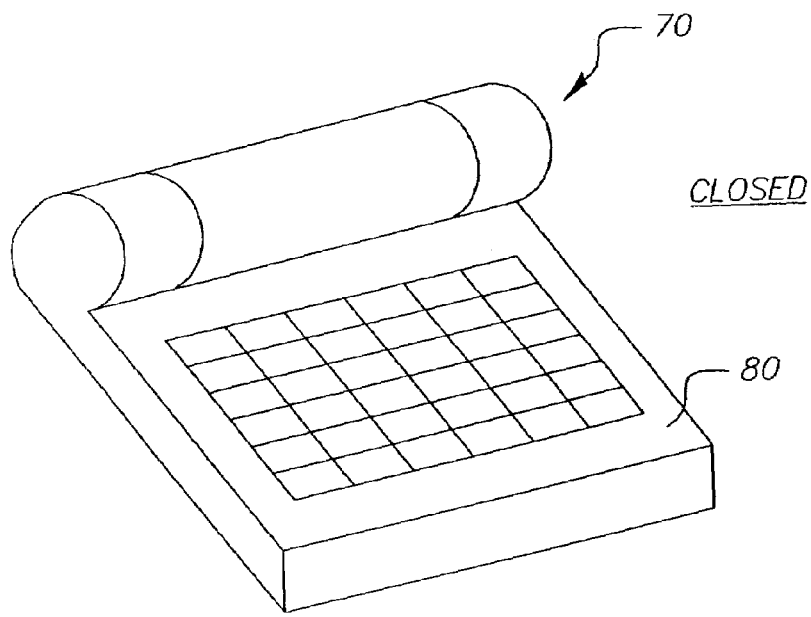
FIG. 1c is a perspective view of system such as a PDA or computer with the arcuate-shaped display receptacle rotated into the base.

Referring now to FIG. 1c, a consumer device such as a PDA 70 is shown and is represented in a manner in which a display is rotated into the PDA base 80, representing a closed position.

Figure 1D:
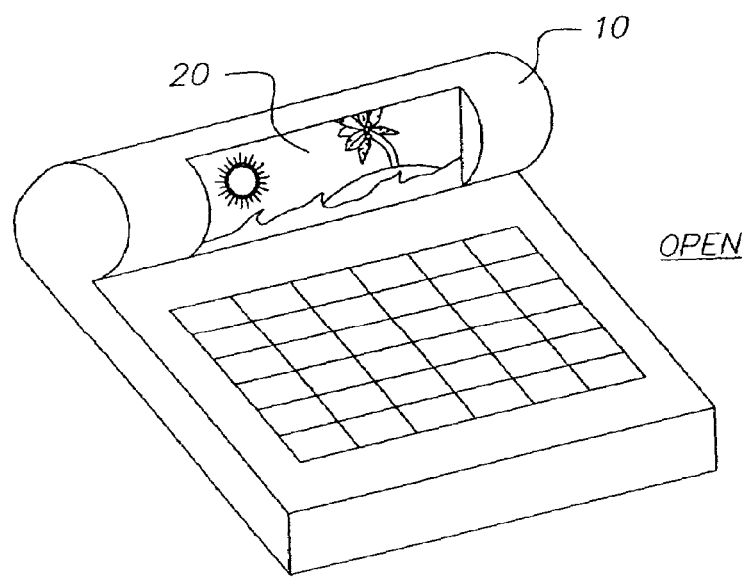
FIG. 1d is a perspective view of system such as a PDA or computer with the arcuate-shaped display receptacle rotated out of the base.

Referring next to FIG. 1d, the display 20 is rotated out of the PDA base 80 and represents an open and operational condition. When closed, the display 20 is protected and through the use of an automatic off/on switch (not shown), power is removed by being actuated at some predetermined position within the rotation of the arcuate-shaped tube 10. When the display 20 is rotated to the open position, determined by the aforementioned predetermined position, the power is automatically turned on and the display 20 is ready for viewing.

Figure 2A:
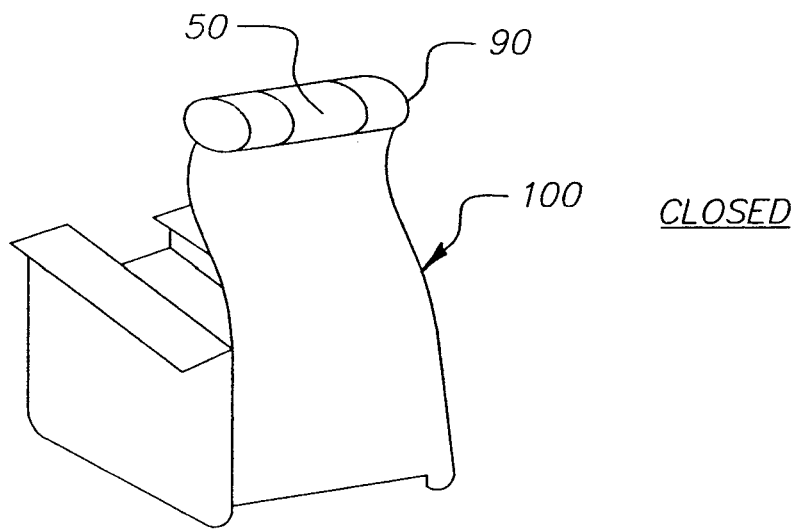
FIGS. 2a and 2b are a rear perspective view of a chair such as might be found in commercial aircraft or an automobile with an arcuate-shaped display as part of the headrest with the arcuate-shaped display receptacle rotated into and out of its base.
Figure 2B:
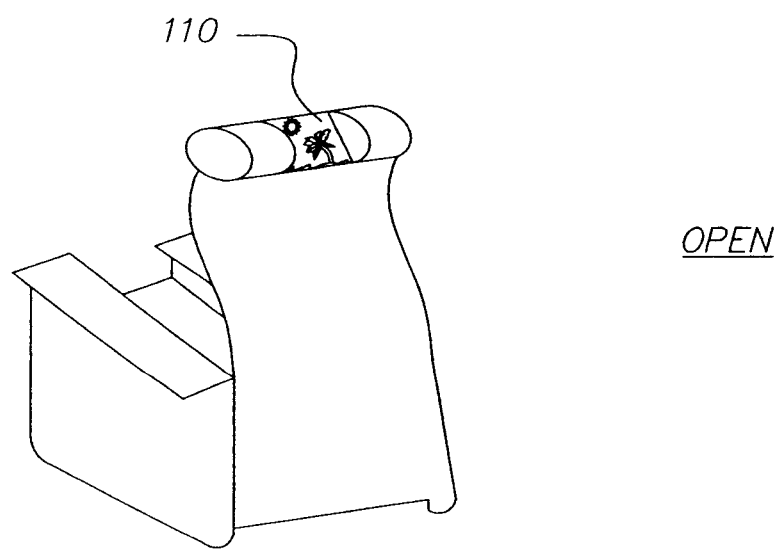

Referring to FIGS. 2a and 2b, seen is an embodiment where the arcuate-shaped display receptacle 50, (from FIG. 1) is designed to be part of the headrest 90 of a chair 100 such as might be found on an airplane, train, or bus. The headrest 90 appears as one continuous piece when display is rotated into the base but upon rotation away from the base the person sitting behind the chair is able to view a high quality display 110. Simply rotating the display turns it off and with no sharp edges provides a supreme measure of safety. It is known that sharp edged interior surfaces contribute to severity of injuries when passengers accidentally fall or are thrust into these surfaces. Therefore, removal of the sharp edges will result in reduced severity of injuries.

Figure 3A:
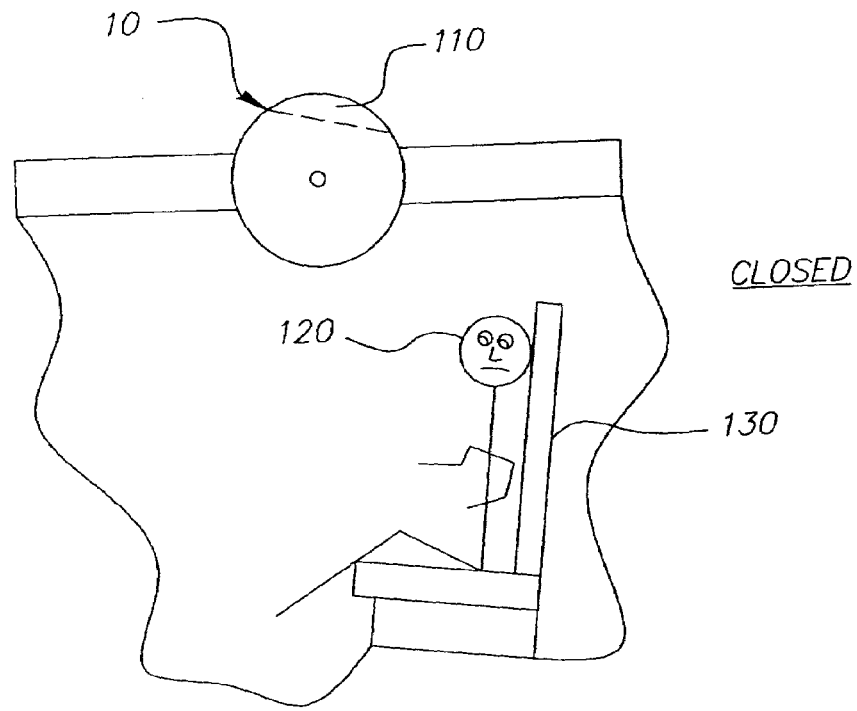
FIG. 3a is a side view of a ceiling mounted display in front of a chair showing the arcuate-shaped display rotated into its base.
Figure 3B:
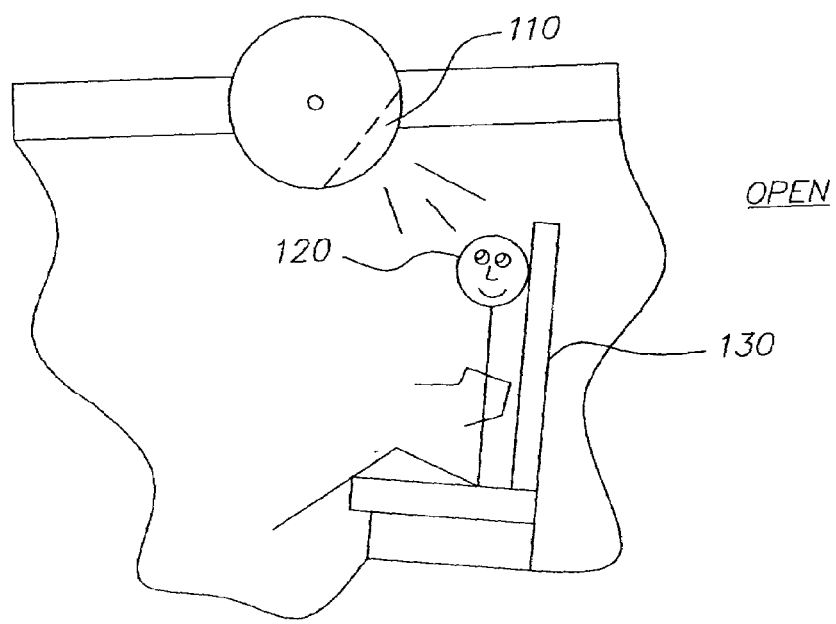
FIG. 3b is a side view of a ceiling mounted display in front of a chair showing the arcuate-shaped display rotated out of its base.

Referring to FIG. 3a is an embodiment wherein a high quality display 110 is mounted above a person 120 as for example in an airline seat 130. Rotating the arcuate-shaped tube 10 (from FIG. 1), allows the person 120 to align the high quality display 110 for optimum viewing as shown in FIG. 3b. Note that in current embodiments on airplanes, displays are often rectangular shaped and hazardous wherein the current embodiment provides additional passenger safety and robustness.

Figure 4A:
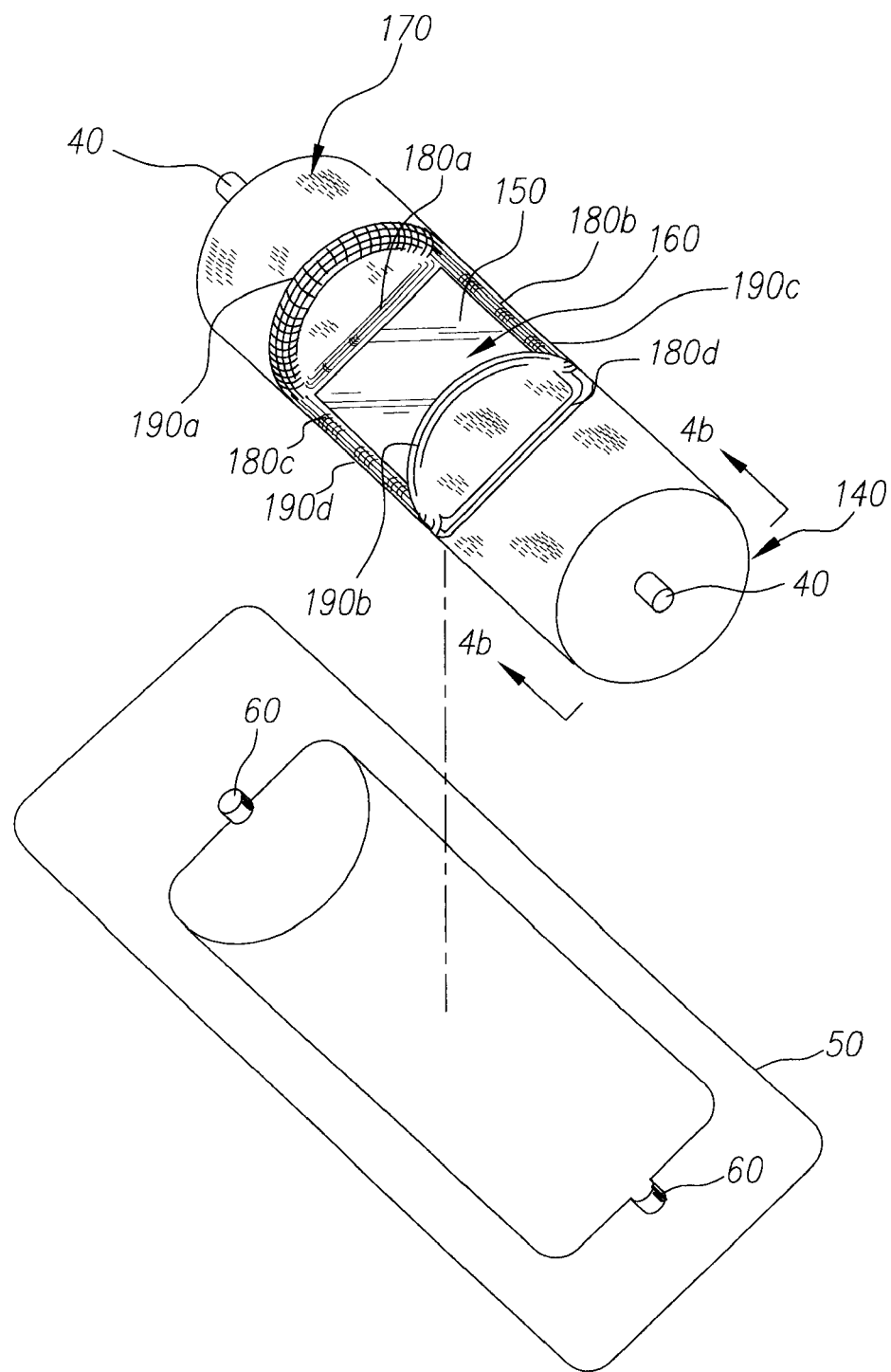
FIGS. 4a and 4b are a perspective view and end view of an alternative embodiment of the display tube.
Figure 4B:
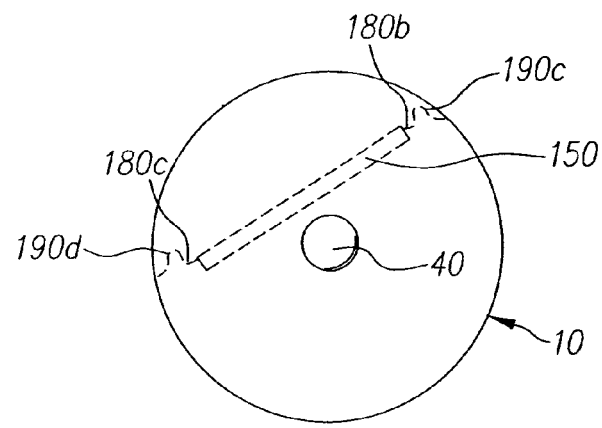

Referring to FIGS. 4a and 4b, there is shown an alternative embodiment of the present invention that includes the base or receptacle 50 which is the same as described hereinabove and a cylinder (or tube) 140 that includes chamfered edges as described hereinbelow. In this regard, the cylindrically-shaped cylinder 140 includes a display 150 that is disposed in a recessed portion 160 of the cylinder 140. A portion of plush material 170, such as foam covered with a fabric or a spongy fabric, extends from the all four sides of the display, and the plush material includes four fillet edges 180a-180d for eliminating sharp or pointed edges and providing smooth transitions between surfaces and they also provide additional padding. The cylinder 140 also includes four chamfered edges 190a-190d on its exterior portion for eliminating sharp or pointed edges on the exposed portion of the cylinder 140 and providing smooth transitions between surfaces. The fillet edges 180a-180d and the chamfered edges 190a-190d obviously provide safety to persons in the vicinity of the cylinder 140. It is noted that the display 150 may be a OLED, LCD or plasma type in their construction.

Figure 5:
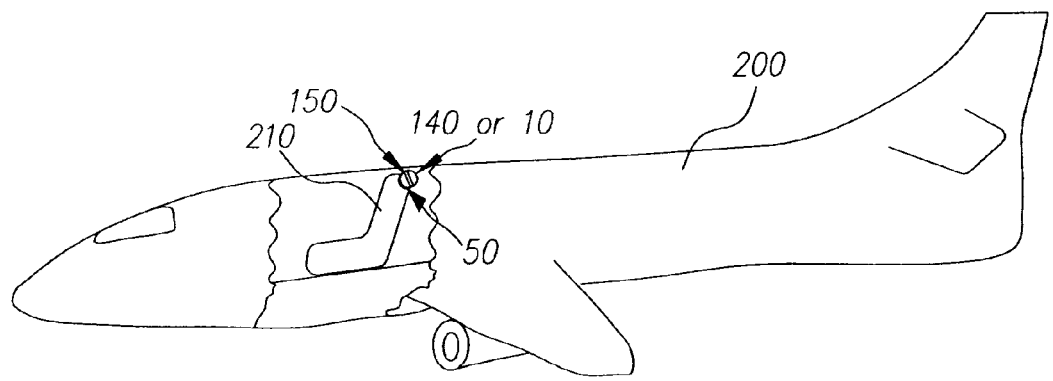
FIG. 5 is a perspective view of an airplane in which the display tube and receptacle may be disposed for use in transportation.

Referring to FIG. 5, there is shown a self-propelled vehicle 200 having a seat 210, an airplane, in which the cylinder or tube 140 or 10, and display 150 or 20 in its receptacle 50 may be disposed for use in transportation. Although an airplane is shown, the vehicle 200 may be a train, automobile, boat or the like.

The invention has been described with reference to a preferred embodiment. However, it will be appreciated that variations and modifications can be effected by a person of ordinary skill in the art without departing from the scope of the invention.

PARTS LIST 10 arcuate-shaped display tube
20 display
30 flat section
40 rotational members
50 arcuate-shaped base (display receptacle)
60 rotational member receptacles
70 PDA
80 PDA Base
90 headrest
100 chair
110 high quality display
120 person
130 airline seat
140 cylinder
150 display
160 recessed portion
170 plush material
180a-180d four fillet edges
190a-190d four chamfered edges
200 self-propelled vehicle
210 seat

The invention claimed is:

1. A system for displaying images comprising:
   (a) a base;
   (b) a movable, cylindrically-shaped cylinder that rotates into and from the base and that includes two fillet edges in an interior portion and four chamfered edges in an exterior portion;
   (c) a display disposed in a recessed portion of the cylinder and adjacent the two chamfered edges so that the display is substantially devoid of sharp or pointed edges and so that the display is visible when the receptacle is rotated about the base to a first position and the display is partially or entirely not visible when the receptacle is rotated about the base to a second position.

2. The system as in claim 1, wherein the display is a flat-panel display.

3. The system as in claim 1 further comprising an additional two fillet edges disposed in the recessed portion and adjacent the display so that the display is completely devoid of sharp or pointed edges.

4. The system as in claim 1, wherein the display is either an OLED, LCD or plasma type display.

5. A self-propelled vehicle comprising:
   (a) abase;
   (b) a movable, cylindrically-shaped cylinder that rotates into and from the base and that includes two fillet edges in an interior portion and four chamfered edges in an exterior portion;
   (c) a display disposed in a recessed portion of the cylinder and adjacent the two chamfered edges so that the display is substantially devoid of sharp or pointed edges and so that the display is visible when the receptacle is rotated about the base to a first position and the display is partially or entirely not visible when the receptacle is rotated about the base to a second position.

6. The self-propelled vehicle as in claim 5, wherein the display is a flat-panel display.

7. The system as in claim 5 further comprising an additional two fillet edges disposed in the recessed portion and adjacent the display so that the display is completely devoid of sharp or pointed edges.

8. The system as in claim 5, wherein the display is either an OLED, LCD or plasma type display.

* * * * *